J. W. OLSSON.
TOY VEHICLE.
APPLICATION FILED APR. 6, 1918.
1,299,015.
Patented Apr. 1, 1919.
2 SHEETS—SHEET 2.
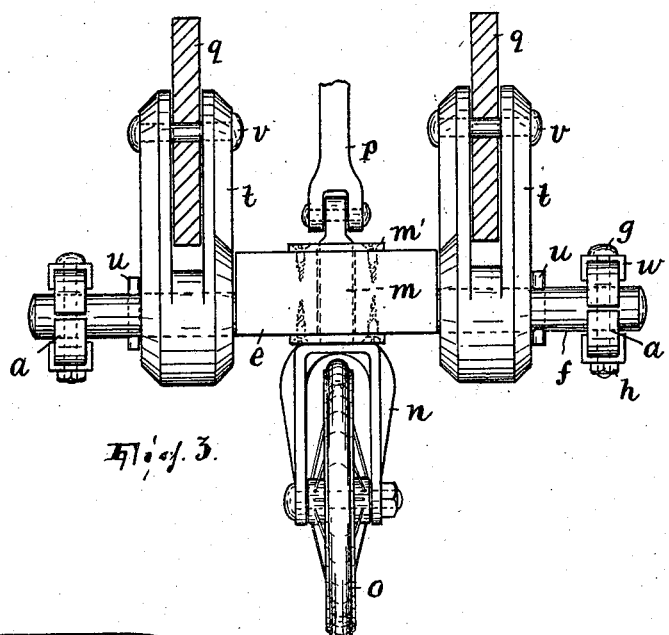
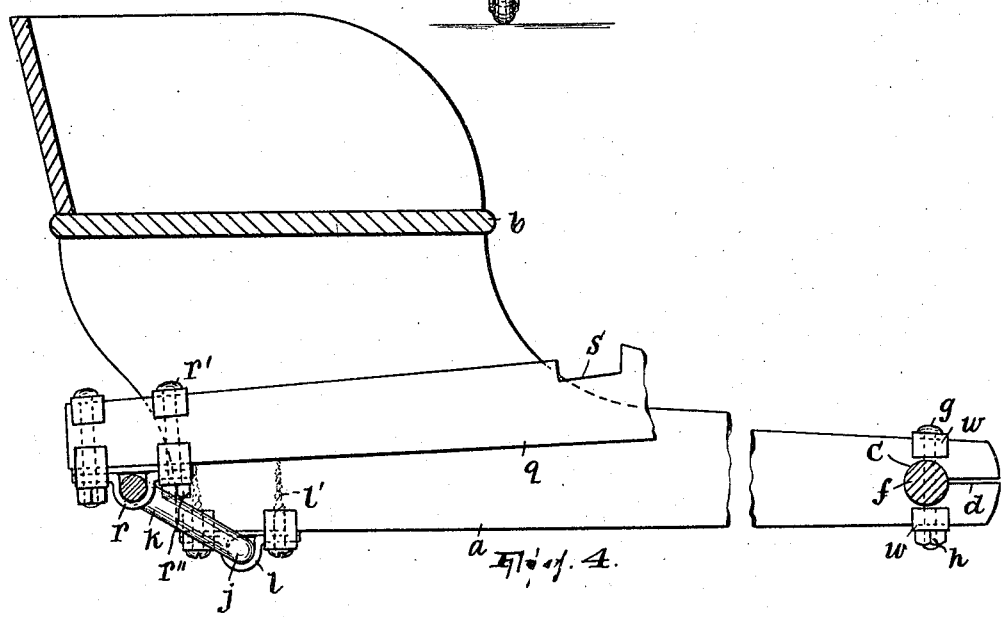
WITNESS:
Wm D Bell
INVENTOR,
John W. Olsson,
BY
ATTORNEY.

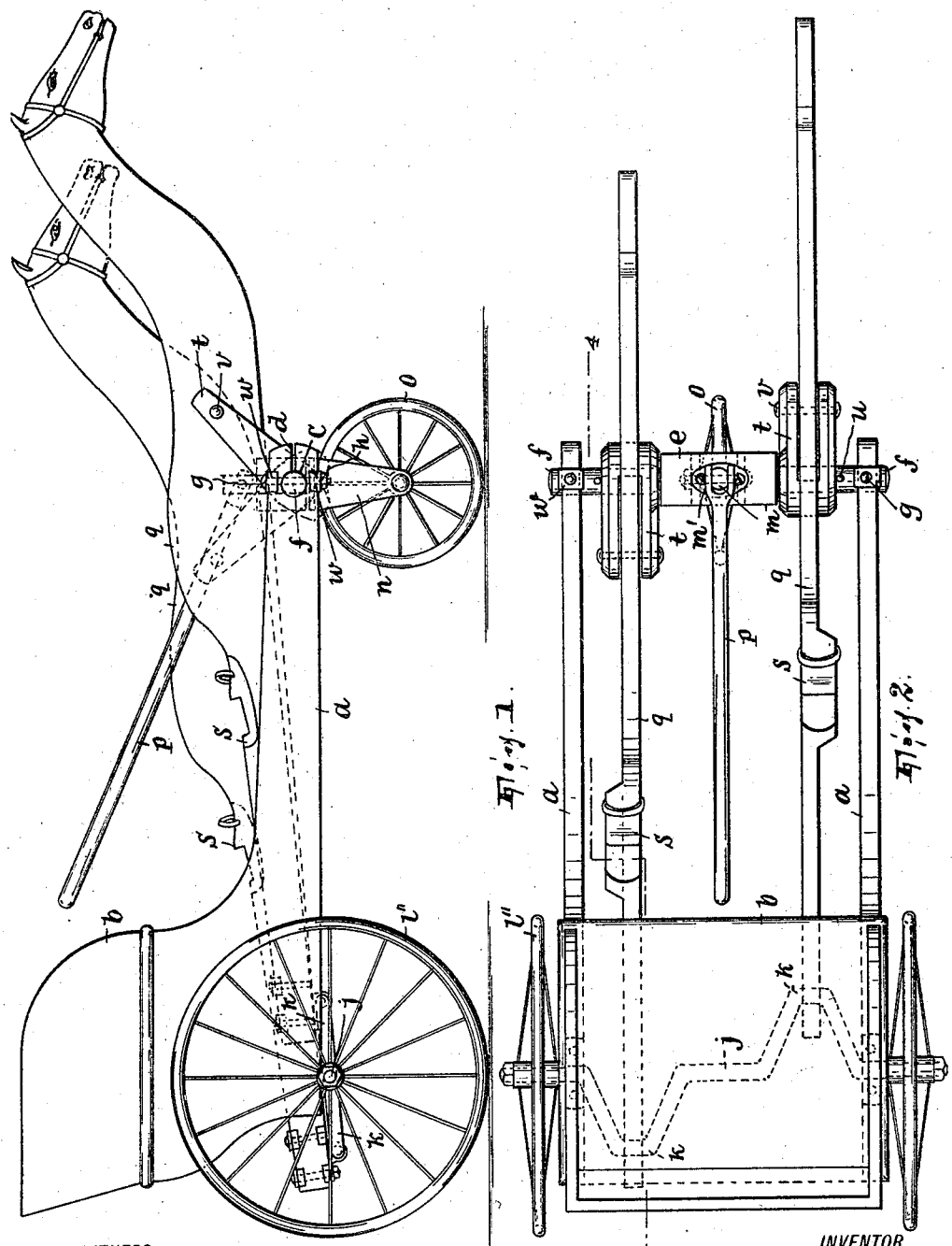

UNITED STATES PATENT OFFICE.

JOHN W. OLSSON, OF PORTSMOUTH, VIRGINIA.

TOY VEHICLE.

1,299,015.  Specification of Letters Patent.  Patented Apr. 1, 1919.

Application filed April 6, 1918. Serial No. 227,121.

*To all whom it may concern:*

Be it known that I, JOHN W. OLSSON, a citizen of the United States, residing at Portsmouth, in the county of Norfolk and State of Virginia, have invented certain new and useful Improvements in Toy Vehicles, of which the following is a specification.

This invention relates to toy vehicles, and its object is to provide a vehicle which shall be inexpensive, simple in construction and strong and durable and which shall contain an element or elements simulating a galloping horse or horses or the like when the vehicle is in motion. The vehicle includes a frame structure, wheel-supports journaled therein in fore and aft arrangement, one wheel-support having a crank rotative therewith, a fulcrumed figure pivoted at one end thereof to the crank, and means in said structure to guide the fulcrum of the figure in an overreaching arc. In the preferred construction said crank, figure and means are duplicated, being so arranged that the figures are moved by the cranks in opposite direction simultaneously.

In the accompanying drawings,

Figure 1 is a side elevation of the invention;

Fig. 2 is a plan;

Fig. 3 a front elevation, showing certain parts in section; and

Fig. 4 a longitudinal sectional view on the line 4—4 of Fig. 2.

The frame structure includes two side members $a$ rigidly connected at the back by a seat $b$ and at their front ends having opposed circular holes $c$ and a slit $d$ in each member extending to said hole, so that the front ends of said members in effect form split clamps. Also included in said structure is the front non-rotary shaft $e$, the intermediate portion of which is preferably square in cross-section and the end portions, $f$, reduced to form bearing spindles, said spindles being received in the clamps of the members $a$ and held therein against turning by bolts $g$ having nuts $h$, the bolts preferably penetrating the spindles.

An axle $j$, having opposite cranks $k$, is journaled in bearings $l$ secured to the rear ends of the members $a$ by the screws $l'$, and has fixed thereon the wheels $l''$, $j$ and $l''$ forming what I herein refer to as the rear wheel-support.

In the shaft $e$, centrally thereof, is journaled the upstanding spindle $m$ of the fork $n$ for the front or steering wheel $o$, said spindle having a guiding handle $p$ pivoted thereto; the parts $n$ $o$ form what I herein refer to as the front wheel-support. Plates $m'$, suitably held against the top and bottom faces of the shaft, preferably afford bearings for the spindle.

$q$ designates two levers which at their forward portions are formed to represent horses or other animals and which at their rearward ends are respectively connected with the cranks $k$, having bearings $r$ to receive them, the bearings being secured to said members by bolts $r'$ penetrating them and having nuts $r''$. At a suitable point forward of the seat each lever $q$ may be adapted as a treadle, as at $s$.

On each spindle $f$ is journaled a forked rocking arm $t$, the same being kept from movement outwardly from the squared portion of the shaft $e$ by a pin $u$ in the spindle. The forked free ends of the arms respectively receive the forward portions of the levers $q$, which are pivoted in said forked portions by means of the pins $v$.

The occupant of the vehicle, sitting on the seat $b$ with his feet on the treadles $s$, may in an obvious manner employ the levers $q$ to turn the rear wheel-support $j$ $l''$ to propel the vehicle. It will be seen that rotation of the rear wheel-support produces a back and forth movement of each lever $q$ and that the latter oscillates on its pivot $v$ as a fulcrum. Further, each lever $q$ performs, while moving forward and back and rocking, a movement following the course of an overreaching arc, this being due to the fact that the radius of each arm $t$ from its axis to its pivot $v$ is greater than the radius of the corresponding crank $k$, whereby the movement of the arm is a rocking one.

The parts $a$, $b$, $e$ and $q$ are preferably made of wood; and to reinforce the parts $a$ and $q$ where the securing devices $g$—$h$, $l'$ and $r'$—$r''$ come and to take the thrust of such devices I preferably provide the U-shaped clips $w$ which fit over the edges of the parts $a$ and $q$ and are penetrated by said securing devices.

Having thus fully described my invention, what I claim as new and desire to secure by Letters Patent is:—

1. In combination, a frame structure, a seat therein, wheel-supports arranged in the frame therein in fore and aft arrangement, one wheel-support having a crank rotative therewith, and means to rotate the crank including a fulcrumed figure pivoted at one end thereof to the crank, and means in said structure to guide the fulcrum of said figure in an overreaching arc.

2. In combination, a frame structure, wheel-supports arranged therein in fore and aft arrangement, one wheel-support having a crank rotative therewith, a fulcrumed figure pivoted at one end thereof to the crank, and means in said structure to guide the fulcrum of said figure in an overreaching arc including an upstanding rocking arm fulcrumed in said structure and having said figure fulcrumed in the free end portion thereof.

3. In combination, a frame structure, wheel-supports arranged therein in fore and aft arrangement, one wheel-support having a crank rotative therewith, a fulcrumed figure pivoted at one end thereof to the crank, and an upstanding rocking arm fulcrumed in said structure and having said figure fulcrumed in the free end portion thereof, the radius from the fulcrum of said arm to the fulcrum of said figure therein exceeding the radius of said crank.

4. In combination, a frame structure, a rear wheel-support journaled therein and including a crank, a steering wheel-support arranged in the frame forward of the rear-wheel support, and means to drive the rear wheel-support including an upstanding rocking arm fulcrumed in the frame and a connecting member pivotally connected to said crank and arm, the radius from the fulcrum of said arm to the point of pivotal connection of said member therewith exceeding the radius of the crank.

5. In combination, a frame structure, a rear wheel-support journaled therein and including a crank, said frame having a forward transverse shaft, a steering wheel-support journaled in said shaft, and means to drive the rear wheel-support including an upstanding rocking arm fulcrumed on said shaft and a connecting member pivotally connected to said crank and arm, the radius from the fulcrum of said arm to the point of pivotal connection of said member therewith exceeding the radius of the crank.

In testimony whereof I affix my signature.

JOHN W. OLSSON.

Copies of this patent may be obtained for five cents each, by addressing the "Commissioner of Patents, Washington, D. C."